United States Patent [19]
Thoman

[11] Patent Number: 5,988,074
[45] Date of Patent: Nov. 23, 1999

[54] COMPOSITE ROOF FOR A RAILWAY CAR

[75] Inventor: Mell R. Thoman, Carrollton, Tex.

[73] Assignee: TRN Business Trust, Dallas, Tex.

[21] Appl. No.: 08/997,075

[22] Filed: Dec. 23, 1997

[51] Int. Cl.⁶ .................................................. B61D 17/00
[52] U.S. Cl. ........................ 105/404; 105/396; 105/409; 296/215
[58] Field of Search ................... 105/396, 397, 105/401, 404, 409; 296/215

[56] References Cited

U.S. PATENT DOCUMENTS

| | | | |
|---|---|---|---|
| 709,894 | 9/1902 | Ferrell . | |
| 1,133,335 | 3/1915 | Summers . | |
| 1,170,129 | 2/1916 | Weaver . | |
| 1,749,473 | 3/1930 | Des Islets . | |
| 2,065,043 | 12/1936 | Bosnall | 108/5.4 |
| 2,406,863 | 9/1946 | Swann | 108/5.4 |
| 2,513,829 | 7/1950 | Vaughn | 108/5.4 |
| 2,620,226 | 12/1952 | Jones | 298/27 |
| 2,635,559 | 4/1953 | Nystrom et al. | 105/416 |
| 2,783,718 | 3/1957 | Cheshire | 105/419 |
| 2,788,750 | 4/1957 | Priest | 105/406 |
| 2,921,814 | 1/1960 | Mede | 296/215 |
| 3,057,284 | 10/1962 | Learmont | 410/135 |
| 3,100,458 | 8/1963 | Baker et al. | 105/397 |
| 3,175,520 | 3/1965 | Talmey | 105/409 |
| 3,200,549 | 8/1965 | Cripe | 52/376 |
| 3,252,430 | 5/1966 | Eckhardt et al. | 105/397 |
| 3,263,379 | 8/1966 | Cisco | 52/53 |
| 3,266,441 | 8/1966 | Pulcrano | 105/416 |
| 3,408,779 | 11/1968 | Allen et al. | 52/53 |
| 3,429,083 | 2/1969 | Voros | 52/53 |
| 3,563,403 | 2/1971 | Luisada et al. | 220/1.5 |
| 3,599,575 | 8/1971 | Yurkoski et al. | 105/358 |
| 3,616,764 | 11/1971 | Johnson et al. | 105/366 |
| 3,789,773 | 2/1974 | McNally et al. | 105/248 |
| 3,823,518 | 7/1974 | Allen | 52/53 |
| 4,020,603 | 5/1977 | Austill | 52/53 |
| 4,076,166 | 2/1978 | Austill | 228/157 |
| 4,168,665 | 9/1979 | Needham et al. | 105/248 |
| 4,209,892 | 7/1980 | Hofstaedter et al. | 105/401 |
| 4,226,189 | 10/1980 | Bertolini | 105/423 |
| 4,230,048 | 10/1980 | Gordon et al. | 105/248 |
| 4,275,662 | 6/1981 | Adler et al. | 105/377 |
| 4,286,507 | 9/1981 | Dorpmund | 98/32 |
| 4,292,898 | 10/1981 | Gordon et al. | 105/238 |
| 4,385,563 | 5/1983 | Bell et al. | 105/377 |
| 4,422,558 | 12/1983 | Mittelmann et al. | 220/1.5 |
| 4,469,541 | 9/1984 | Goldsworthy | 156/180 |
| 4,474,632 | 10/1984 | Spees | 156/78 |
| 4,497,258 | 2/1985 | Ruhmann et al. | 105/248 |
| 4,498,941 | 2/1985 | Goldsworthy | 156/148 |
| 4,608,931 | 9/1986 | Ruhmann et al. | 105/248 |
| 4,902,215 | 2/1990 | Seemann, III | 425/406 |
| 4,904,017 | 2/1990 | Ehrlich | 296/181 |
| 4,998,637 | 3/1991 | Marovskis | 220/1.5 |
| 5,042,395 | 8/1991 | Wackerle et al. | 105/397 |
| 5,050,402 | 9/1991 | Graaff | 62/457.9 |
| 5,052,906 | 10/1991 | Seemann | 425/112 |
| 5,063,859 | 11/1991 | Rader | 105/340 |
| 5,098,007 | 3/1992 | Tsuruda et al. | 228/125 |
| 5,114,516 | 5/1992 | Pilling et al. | 156/180 |
| 5,168,717 | 12/1992 | Mowatt-Larssen | 62/239 |
| 5,199,632 | 4/1993 | Takeichi et al. | 228/181 |
| 5,201,432 | 4/1993 | Elvin-Jensen | 220/1.5 |
| 5,246,321 | 9/1993 | Hesch | 410/58 |
| 5,255,806 | 10/1993 | Korzeniowski et al. | 220/1.5 |
| 5,265,748 | 11/1993 | Furukawa | 220/1.5 |
| 5,267,515 | 12/1993 | Tsuruda et al. | 105/397 |
| 5,287,814 | 2/1994 | Masai et al. | 105/422 |
| 5,299,405 | 4/1994 | Thompson | 52/795 |
| 5,303,658 | 4/1994 | Kohira | 105/401 |
| 5,316,462 | 5/1994 | Seemann | 425/112 |
| 5,320,046 | 6/1994 | Hesch | 105/413 |
| 5,362,345 | 11/1994 | Stettler et al. | 105/397 |
| 5,370,482 | 12/1994 | Long | 105/406 |
| 5,373,792 | 12/1994 | Pileggi et al. | 105/406 |
| 5,383,406 | 1/1995 | Vanolo et al. | 105/401 |
| 5,386,674 | 2/1995 | Sfirakis et al. | 52/243.1 |
| 5,392,717 | 2/1995 | Hesch et al. | 105/404 |
| 5,403,062 | 4/1995 | Sjostedt et al. | 296/181 |
| 5,403,063 | 4/1995 | Sjostedt et al. | 296/187 |
| 5,449,081 | 9/1995 | Sjostedt et al. | 220/1.5 |
| 5,450,977 | 9/1995 | Moe | 220/1.5 |
| 5,458,066 | 10/1995 | Ishida et al. | 105/397 |
| 5,601,034 | 2/1997 | Tao et al. | 105/423 |
| 5,685,229 | 11/1997 | Ohara et al. | 105/397 |
| 5,690,378 | 11/1997 | Romesburg | 296/181 |
| 5,802,984 | 9/1998 | Thoman et al. | 105/404 |

5,988,074
Page 2

FOREIGN PATENT DOCUMENTS

| 232242 | 6/1959 | Australia | 105/397 |
|---|---|---|---|
| 145249 | 12/1980 | Germany | 105/401 |
| 3911138 | 10/1990 | Germany . | |

OTHER PUBLICATIONS

"Scrimp Systems" brochure of Composite Resin Infusion Molding, p. 2 diagram.

Trinity Industries Inc. "Shipper's Problems . . . Trinity's Solutions" pamphlet of steel box car features.

"Trinity Steel Box Car Key Features" one page.

"Shippers' Problems . . . Trinity's Solution!" Trinity Industries, Inc., one page.

Letter from American Composite Inc. of Aug. 27, 1997 including a list of Custom Fiberglass and Composites.

Freight Cars: Mechanical Refrigerator (p. 135).

Co–pending application No. 08/684,345 entitled Insulated Composite Railway Boxcar and Method filed Jul. 19, 1996 (Attorney's Docket 091078.0444).

Co–pending application No. 08/684,564 entitled Composite Box Structure for a Railway Boxcar filed Jul. 19, 1996 (Attorney's Docket 091078.0446).

Co–pending application No. 08/684,537 entitled Load Divider Assembly and Door Assembly for a Composite Railway Boxcar filed Jul. 19, 1996 (Attorney's Docket 091078.0447).

Co–pending application No. 08/859,671 entitled Insulated Composite Railway Boxcar and Method filed May 20, 1997 (Attorney's Docket 091078.0587).

Co–pending application No.08/859,575 entitled Insulated Composite Railway Boxcar Underframe filed May 20, 1997 (Attorney's Docket 091078.0588).

Co–pending application No. 09/020,372 entitled Temperature Controlled Composite Boxcar filed Feb. 9, 1998 (Attorney's Docket 091078.0600).

Co–pending application No. 08/684,345 entitled Railway Car Underframe for an Insulated Composite Boxcar filed Dec. 5, 1997 (Attorney's Docket 091078.0650).

Single Page: "Freight Cars: Mechanical Refrigerator." Pacific Fruit Express, p. 135.

Manual: "Equipment Diagram For Unrestricted Interchange Service." Association of American Railroads Mechanical Division, Aug. 1991, pp. C–249—C–256.2.

Article:"A better boat, a greener boatwords." Sail Magazine, Aug. 1993, pp. 27–29.

Brochure: "Simply . . . Making it Easier to Ship Your Frozen Foods." General American Transportation Corporation.

Brochure: "Scrimp Systems . . . Composite performance and quality." Dupont, Delaware Technology Park.

Catalog pages from General American Transportation Corporation on GATX ARCTICAR (8 pages).

Catalog pages from Stoughton Composites, Inc. on Domestic Container (5 pages).

Catalog pages from Pullman–Standard, Division of Pullman Incorporated, on Foamed–in–Place Insulated Box Cars (5 pages).

Catalog pages from Pacific Car and Foundry Company (19 pages).

Catalog page on C.H. Robinson 48–foot domestic container.

Catalog pages from GRAAFF GmbH on "Sandwich Technology for Refrigerated and Insulated Transport Equipment" May 1994 (9 pages).

Miscellaneous pages from *Introduction to Composites on Constituents of Composites* (20 pages).

G. Welty "New Designs, New Materials, Freight Cars", Railway Age, Feb. 1994, p. 29.

M. Gabriele, "Pultrusion's Promise", Plastics Technology, Mar. 1995, p. 36.

"FRP Goes After Intermodal Container Market", Plastics World, Oct. 1993, p. 16.

Brochure, "Stoughton Composites, Inc. Introduces Lightweight Refrigerated Domestic Containers", Stoughton Composites, Dec. 1993, pp. 1–10.

Drawing, "Car Body Assembly" GRAAFF GmbH, May 1994, p. 1.

Catalogue Item, "Durashield Foam Core Building Panels", Ryerson Plastics Catalogue No. 21, 1992, p. 112.

Shippers' Problems . . . Trinity's Solution!, Trinity Industries, Inc. advertisement.

"Trinity Steel Box Car Key Features", specification sheet.

*Primary Examiner*—Mark T. Le
*Assistant Examiner*—Robert J. McCarry, Jr.
*Attorney, Agent, or Firm*—Baker & Botts, L.L.P.

[57]   ABSTRACT

A composite roof having a core encapsulated in multiple layers of fiber reinforced plastic is provided. The composite roof may be mounted on a conventional railway car during initial manufacture or used to replace a damaged steel roof on a conventional railway car. The layers of fiber reinforced plastic provide non-corrosive and non-leaking exterior and interior surfaces for the composite roof. The core may be formed from various materials which provide improved resistance to heat transfer between the interior and the exterior of an associated railway car. The composite roof may be mounted on an enclosed structure having a pair of end walls, a pair of side walls and a floor. An opening may be formed in each side wall to allow access to the interior of the railway car. A top retainer and guide rail assembly will typically be mounted above each opening to allow installing a door to control access through the respective opening. A strip of fiber reinforced plastic is preferably attached to the top retainer and guide rail assembly to form a composite rain gutter over each opening.

23 Claims, 5 Drawing Sheets

COMPOSITE ROOF FOR A RAILWAY CAR

TECHNICAL FIELD OF THE INVENTION

This invention relates generally to a composite structure and more particularly to a composite roof which may be used with various types of railway cars.

BACKGROUND OF THE INVENTION

Over the years, general purpose railway boxcars have progressed from relatively simple wooden structures mounted on flat cars to more elaborate arrangements including insulated walls and refrigeration equipment. Various types of railway boxcars are presently manufactured and used. A typical railway boxcar includes an enclosed structure mounted on a railway car underframe. The enclosed structure generally has an outer shell and interior paneling. The outer shell of many railway boxcars is often formed from various types of metal such as steel or aluminum. The interior paneling is often formed from wood and/or metal as desired for the specific application. For some applications the interior paneling has been formed from fiber reinforced plastic (FRP). Conventional railway boxcars are assembled from various pieces of wood, steel and/or sheets of composite materials such as fiberglass reinforced plastic. Insulated railway boxcars typically have one or more layers of insulation disposed between the outer shell and the interior paneling.

Various techniques and procedures have previously been used to satisfactorily mount or attach a roof on an enclosed structure with a typical railway car. U.S. Pat. No. 1,749,473 entitled *Roof Structure* shows examples of such procedures and techniques. U.S. Pat. No. 4,076,166 entitled *Roof for Railway Car and Method of Making Same* discloses a unitary railway car roof formed from two elongated webs of sheet metal. U.S. Pat. No. 4,275,662 entitled *Railway Hopper Car Roof Support Structure* shows additional examples of techniques and procedures which may be used to mount a roof on a railway car.

Many existing railway boxcars have a roof formed from galvanized steel. A typical galvanized steel roof may include ten to fifteen corrugated panels or sheets. Adjacent portions of the corrugated panels generally overlap each other. Various types of mechanical features are used to attach overlapping sometimes portions of the panels, the overlapping portions may be referred to as a "seam" or "joint" between adjacent panels. The seams or joints typically extend across the full width of the associated railway car. A seam cap is often placed over each joint between adjacent panels or sheets. The seam caps also extend across the width of the associated railway car roof.

Galvanized sheet steel is subject to rust and corrosion during the life of the associated railway car. Overlapping edges of adjacent panels or sheets and particularly the large number of mechanical fasteners at each joint may provide multiple paths for leakage of water which can damage lading carried within the interior of the associated railway car. Some estimates indicate that as much as fifty percent (50%) of all loss and damage claims related to shipping paper products in railway cars may be due to water leakage through the associated steel roof. The amount of such losses runs into millions of dollars each year.

For many years various techniques have been used to build fiberglass boat hulls. Many of these hulls have been fabricated using wet layup techniques in which each layer of material such as fiberglass or carbon fiber is first wetted with the desired resin such as polyester or vinylester and then laid in an open mold. Recently, vacuum bagging techniques have been combined with wet layup techniques to control the emission of volatile organic compounds. Vacuum bagging also produces a stronger structure by eliminating air pockets and excess resin in the finished product.

More recently, vacuum bagging techniques have been combined with an enhanced resin delivery system which allows the use of a closed molding system and dry layup of core layers and fiber reinforcing layers such as fiberglass in the mold. This process may sometimes be referred to as composite resin infusion molding. U.S. Pat. Nos. 4,902,215; 5,052,906 and 5,316,462 provide additional information concerning this type of vacuum bagging process to form a fiberglass reinforced composite article.

All patents noted in the Background of the Invention are incorporated by reference for all purposes within this application.

SUMMARY OF THE INVENTION

In accordance with teachings of the present invention, disadvantages and problems associated with previous roofs for railway cars have been substantially reduced or eliminated. The present invention provides a composite structure or roof for a railway car having enhanced insulation, reduced weight, and increased service life as compared to a typical railway car. A composite structure incorporating teachings of the present invention provides a high strength composite roof formed from tough, durable, non-corrosive, water resistant or water proof materials.

One aspect of the present invention includes a one piece, seamless composite roof which extends over approximately the full length and full width of an associated railway car. The composite roof may be mounted on an enclosed structure during initial manufacture of the associated railway car or may be used to replace a conventional steel roof during maintenance and repair of a railway car. The composite roof is preferably molded as a single unit using vacuum bagging techniques along with dry layup of selected material layers and an enhanced resin delivery system. For some applications a metal flange is preferably co-molded around the perimeter of the composite roof for use in mounting the composite roof on the enclosed structure of the associated railway car using conventional welding techniques.

Technical advantages of the present invention include providing a composite roof which has been molded as a single unit without seams to eliminate potential paths for water leakage into the interior of an associated railway car. The composite roof preferably includes a generally flush exterior surface with improved aerodynamic characteristics and a generally flush interior surface which minimizes damage during loading and unloading of the associated railway car. For example, tall rolls of paper are sometimes damages during loading and unloading by the interior surface associated with a conventional steel boxcar roof. A composite roof incorporating teachings of the present invention is typically lighter in weight than a conventional steel roof. For some applications, a composite roof may weigh as much as 1500 pounds less than a corresponding conventional steel roof. The reduced weight of the composite roof allows for potential increases in the payload carried by the associated railway car.

Another aspect of the present invention includes providing a composite roof having several translucent areas which allow light to pass through the composite roof without compromising the waterproof integrity by requiring additional seams or joints. The translucent areas provide better lighting for an improved working environment during loading and unloading of the associated railway car. The interior and exterior surfaces of the composite roof may include one or more acrylic or film materials to provide ultraviolet protection and any desired coloration. Technical advantages of the present invention include eliminating or substantially reducing any requirement to paint the interior and/the exterior surfaces of the composite roof.

A further aspect of the present invention includes providing a one piece rain gutter over each doorway opening of the associated railway car to catch and redirect rainwater away from the door opening. A one-piece rain gutter formed from noncorrosive materials incorporating teachings of the present invention substantially reduces any water damage which may occur during loading or unloading of products shipped within the associated railway car. A composite roof and a rain gutter incorporating teachings of the present invention cooperate with each other to reduce damage and loss claims for products shipped in the associated railway car.

BRIEF DESCRIPTION OF THE DRAWINGS

For a more complete understanding of the present invention, and the advantages thereof, reference is now made to the following written description taken in conjunction with the accompanying drawings, in which.

DETAILED DESCRIPTION OF THE INVENTION

The preferred embodiments of the present invention and its advantages are best understood by referring to FIGS. 1A through 7 of the drawings, like numerals being used for like and corresponding parts of the various drawings.

Figure 1A:
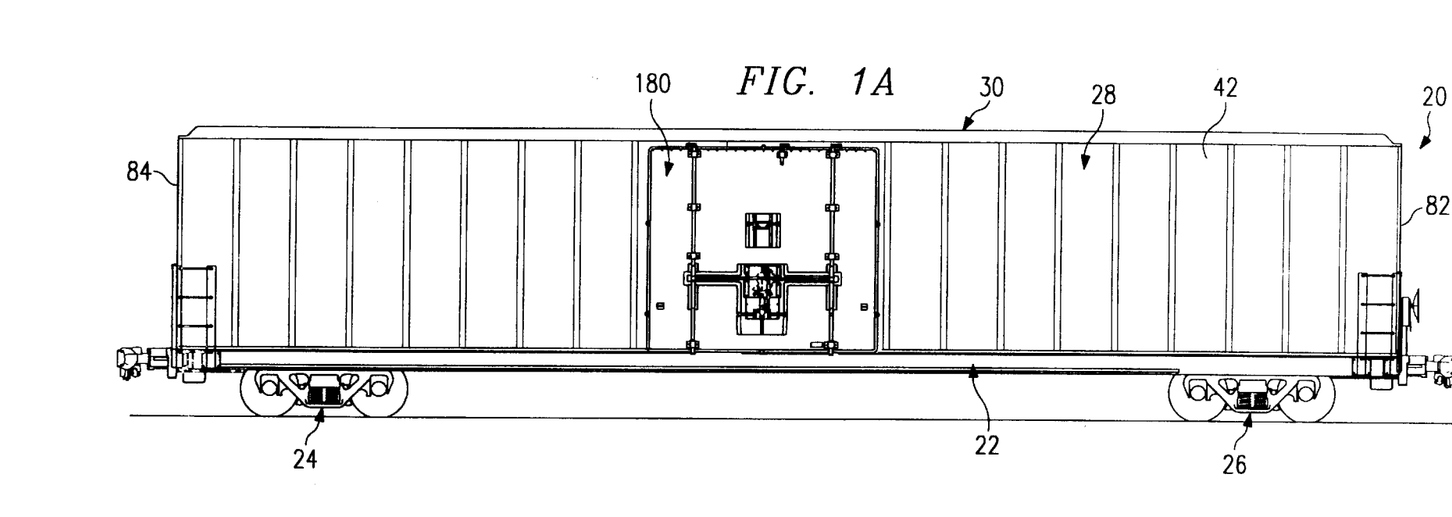
FIG. 1A is a schematic drawing in elevation showing a side view of a railway car having a composite roof incorporating teachings of the present invention.
Figure 1B:
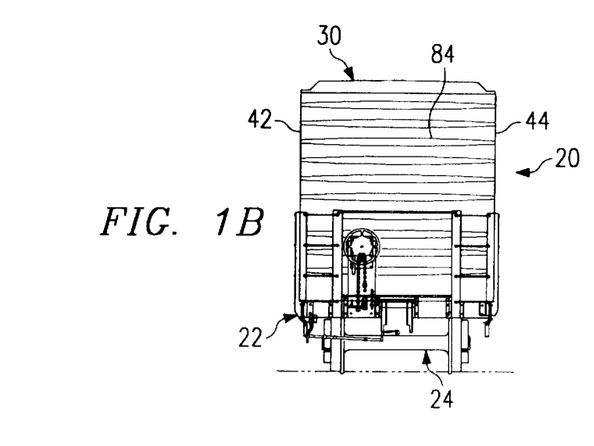
FIG. 1B is an end view of the railway car of FIG. 1A.
Figure 2:
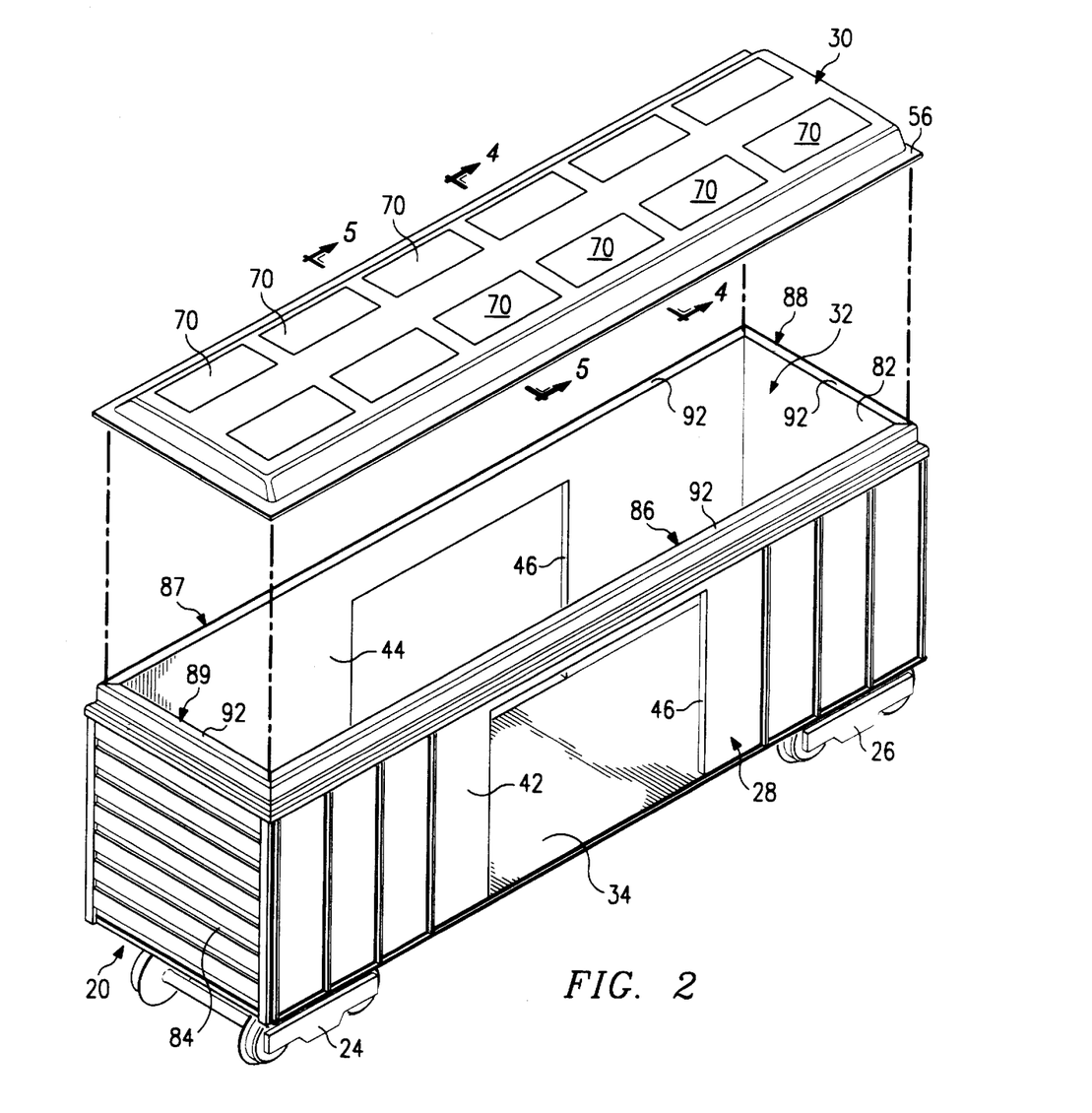
FIG. 2 is a schematic drawing showing an exploded, isometric view of a composite roof and a railway car with multiple translucent areas which may be joined together to form a composite roof in accordance with one aspect of the present invention.

Railway car 20 with composite roof 30 incorporating teachings of the present invention is shown in FIGS. 1A, 1B and 2. Except for composite roof 30, railway car 20 represents a conventional steel boxcar. For some applications, railway car 20 may be insulated and/or refrigerated as desired. Also, teachings of the present invention may be satisfactorily used to provide a composite roof for a wide variety of railway cars including covered hopper cars, autorack cars and passenger cars. The present invention is not limited to use with only railway boxcars.

Railway car 20 includes railway car underframe 22 with a pair of railway trucks 24 and 26 located adjacent to each end of railway car 20. Enclosed structure 28 is mounted on and attached to railway car underframe 22. For the embodiment shown in FIGS. 1A–3 enclosed structure 28 includes side walls 42 and 44, end walls 82 and 84 and floor 34 such as typically associated with a conventional railway boxcar. However, a composite roof incorporating teachings of the present invention may be used with a wide variety of enclosed structures associated with various types of railway cars and is not limited to use with only enclosed structure 28.

Floor 34, side walls 42 and 44 and end walls 82 and 84 may be attached to each other and secured to railway car underframe 22 using conventional techniques associated with fabricating railway boxcars. Side walls 42 and 44 along with end walls 82 and 84 and floor 34 cooperate with each other to partially define hollow interior 32 of railway car 20 in which various types of lading may be placed for shipment. Composite roof 30 preferably has dimensions corresponding with side walls 42 and 44 and end walls 82 and 84 to allow attaching composite roof 30 with end walls 82 and 84 and side walls 42 and 44 opposite from floor 34.

Generally rectangular openings 46 an provided intermediate the ends of respective side walls 42 and 44. Doors 180 may be slidably mounted on each side wall 42 and 44 adjacent to the respective opening 46 for use in controlling access to interior 32 of enclosed structure 28. For some applications the center of each opening 46 corresponds approximately with the midpoint of the respective side wall 42 and 44. However, a composite structure incorporating teachings of the present invention may be used to provide a roof for a wide variety of railway cars with doors or openings in other locations. For example, a composite roof incorporating teachings of the present invention may be satisfactorily used on autorack cars which typically include doors at opposite ends thereof.

As will be explained later in more detail, composite roof 30 may be adhesively bonded and/or mechanically engaged with enclosed structure 28. For some applications, only mechanical connections may be formed between composite roof 30 and side walls 42 and 44 and end walls 82 and 84. For other applications, only adhesive bonds may be formed. For still other applications, welding and/or a combination of adhesive bonds and mechanical connections may be formed between composite roof 30 and side walls 42 and 44 and end walls 82 and 84.

Forming composite roof 30 from light weight composite materials in accordance with teachings of the present invention generally results in reducing the weight of railway car 20 and increasing the load carrying capacity as compared to the same railway car with a conventional steel roof. Using various teachings of the present invention, composite roof 30 may be satisfactorily molded as a single, one-piece unit with dimensions corresponding with the associated railway car 20. For example, composite roof 30 may have a width of approximately ten feet. A typical length for composite roof 30 may be fifty feet six inches, fifty-two feet eight inches, sixty feet nine inches or eighty-six feet depending upon the dimensions of the enclosed structure on which composite roof 30 will be mounted.

For purposes of this patent application, the term "fiber reinforced plastic" is used to refer to composite materials composed of selected thermosetting or thermoplastic resins and fibers, filaments, or whiskers of material such as glass, metal, aramid, boron, carbon, aluminum silicate and other suitable ceramic materials. For some applications, small flakes of metal, ceramics, cermets, or other suitable materials may be dispersed within the selected resin or resins to provide additional reinforcement and strength for the resulting fiber reinforced plastic.

For purposes of this patent application, the term "resin" is used to include both naturally occurring and synthetic polymers which may be mixed with various additives such as fillers, colorants, plasticizers, and curing agents, to infuse or impregnate the selected fiber material to form the desired fiber reinforced plastic layers and surfaces during fabrication of composite roof 30. For one application the fiber material preferably includes glass fibers typically associated with FIBERGLAS® products available from Owens-Corning.

Composite roof 30 is preferably fabricated using vacuum bagging techniques which include dry lay up of selected core materials and multiple layers of selected fiber materials in a closed molding system (not shown) along with an enhanced resin delivery system (not shown). However, other molding techniques may be satisfactorily used to fabricate composite roof 30 from fiber reinforced plastic materials. Some of the benefits of using a closed molding system include the ability to fabricate a large number of composite roofs 30 from the same mold with dimensions that meet applicable American Association of Railroads (AAR) plate requirements and provide a smooth, aerodynamic exterior surface for the resulting railway car 20.

Closed molding systems and enhanced resin delivery systems may be modified to form composite roof 30 with various configurations and dimensions as required for the specific railway car 20. U.S. Pat. Nos. 4,902,215; 5,052,906 and 5,316,462 show examples of vacuum bagging techniques satisfactory for use with the present invention. Composite resin infusion molding processes incorporating various features of these patents have been licensed to Hardcore Dupont Composites L.L.C. located at 42 Lukens Drive, New Castle, Del. Various types of composite structures molded in accordance with the teachings of these patents are available from Hardcore DuPont.

For the embodiments shown in FIGS. 1A–6, composite roof 30 may be generally described as a fiber reinforced composite unit or structure. For some applications composite roof 30 is preferably molded as a single fiber reinforced composite unit, as shown in FIG. 2. For other applications, composite roof 30 may be molded as two or more separate components which are later attached to each other using a combination of adhesive bonds and/or mechanical fasteners. As a result of the present invention, composite roof 30 may be modified to accommodate various geometric configurations based on specific customer requirements concerning the size and type of enclosed structure and associated railway car on which composite roof 30 will be mounted.

Composite roof 30 preferably includes foam core 53 covered or wrapped with multiple plies of fiber material which have been infused with a selected resin to encapsulate foam core 53 with one or more layers 51 and 52 of fiber reinforced plastic. The multiple plies of fiber material and the selected resin provide fiber reinforced plastic exterior surface 61 and fiber reinforced plastic interior surface 62 for composite roof 30. For some applications, foam core 53 may have a thickness of two or three inches.

Figures 4, 5:
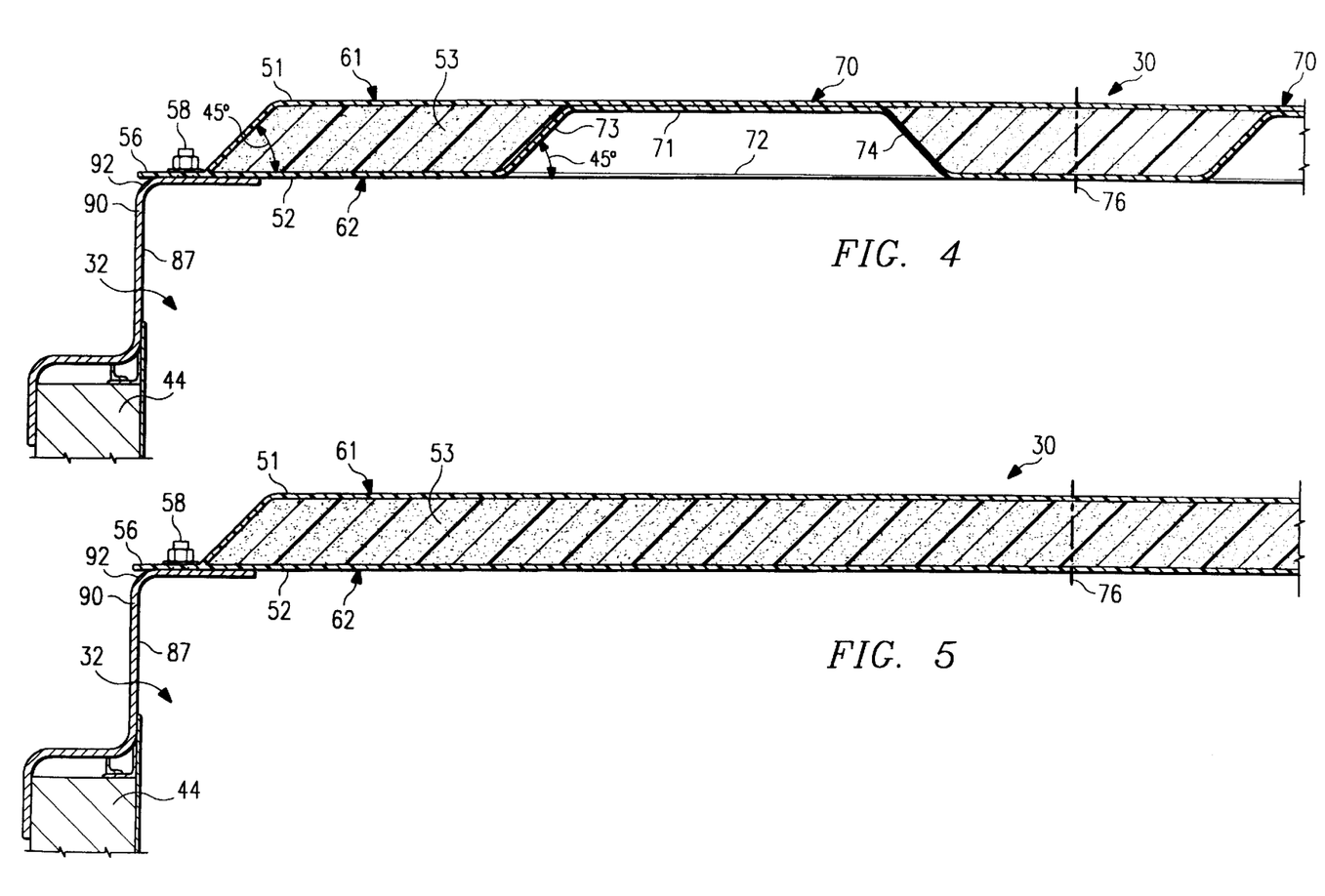
FIG. 4 is a schematic drawing in section with portions broken away taken along lines 4—4 of FIG. 2 showing the composite roof having a foam core covered with one or more layers of fiber reinforced plastic in accordance with teachings of the present invention.
FIG. 5 is a schematic drawing in section with portions broken away of the composite roof taken along lines 5—5 of FIG. 2.
Figure 6:
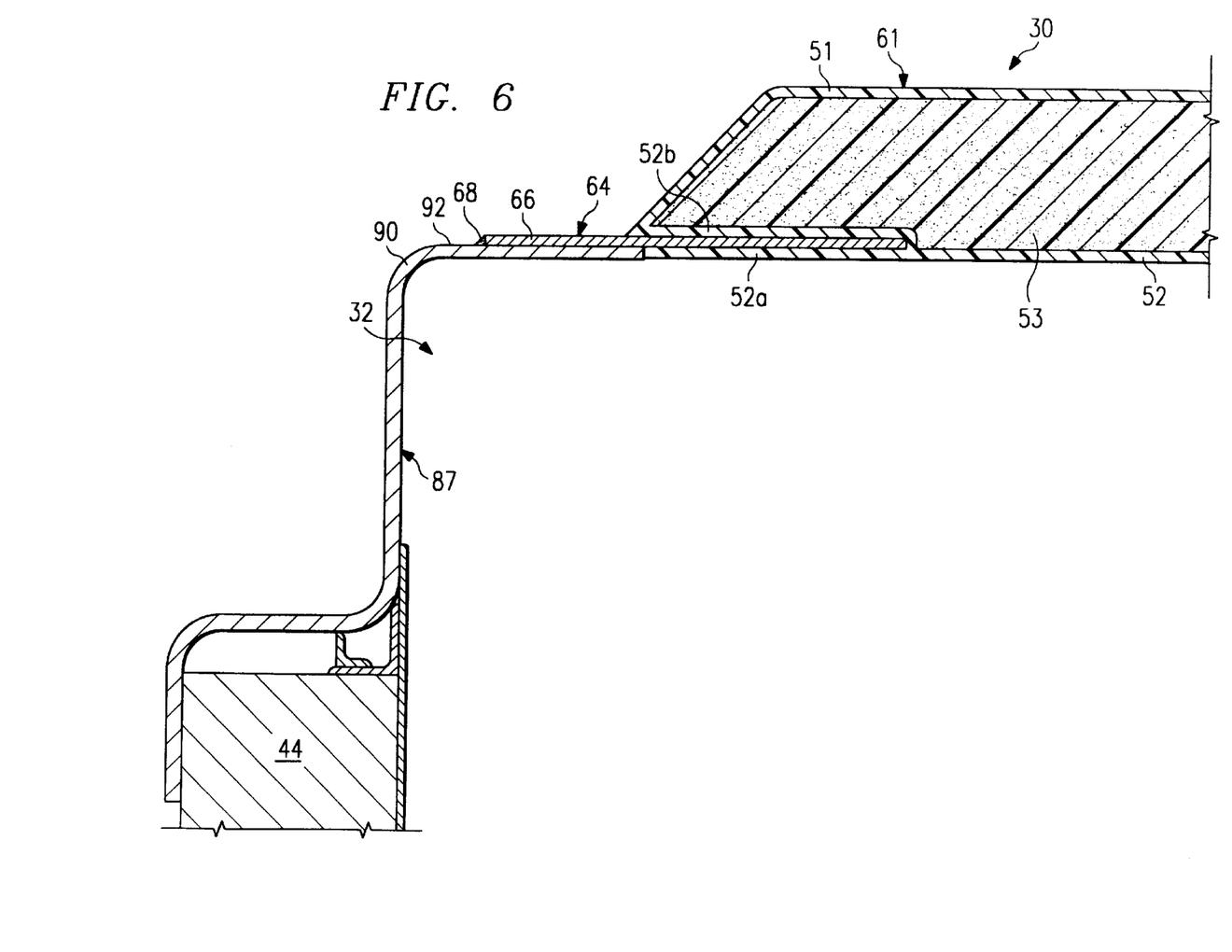
FIG. 6 is a schematic drawing in section with portions broken away showing an example of a connection formed between a composite roof and one wall of a typical enclosed structure of a railway car incorporating a further embodiment of the present invention.

As illustrated in FIGS. 4, 5 and 6, first layer 51 of fiber reinforced plastic is preferably disposed on the exterior surface 61 of composite roof 30. Second layer 52 of fiber reinforced plastic is preferably disposed on the interior surface 62 of composite roof 30. As a result of the molding process first layer 51 provides a continuous, smooth exterior surface 61 of fiber reinforced plastic for railway car 20. The configuration of foam core 53 may be varied in accordance with the teachings of the present invention depending upon the requirements of the associated railway car 20. Void spaces may be formed in foam core 53 to provide translucent areas 70 which will be discussed later in more detail.

Foam core 53 may be formed from various types of material such as urethane, polyurethane, styrene and polystyrene. For some applications core 53 may be formed with light metal foam. Also, foam core 53 may have various configurations such as foam blocks wrapped with one or more plies of a selected fiber material or layers of a selected foam material alternating with plies of a selected fiber material. For still other applications foam core 53 may be replaced with light weight wood such as balsa wood or a heavier wood such as plywood.

The selected core material and multiple plies of fiber material may be placed in a closed molding system having the desired configuration for composite roof 30. A resin delivery system is used to infuse or impregnate the multiple plies of fiber material with the selected resin. Depending upon the intended application for the resulting railway car 20, the fiber material may include carbon, boron, graphite, glass, aramid or a combination of these materials. Aramids such as KEVLAR® fibers and NOMEX® fibers available from E.I. DuPont De Nemours & Co. may be particularly useful in fabricating composite roof 30. Other fiber materials may be satisfactorily used with the present invention. Again, depending upon the intended application for railway car 20, the resin may be selected from a wide variety of polymers including epoxy, polyester, vinylester and vinyl. Also, other resins may be satisfactorily used with the present invention.

Selecting the type of material used to form foam core 53 along with other teachings of the present invention will substantially reduce or minimize potential heat transfer paths through composite roof 30. Foam core 53 for composite roof 30 may be formed from a plurality of foam blocks (not expressly shown). Alternatively, foam core 53 may be formed from a grid (not expressly shown) of the selected foam material alternating with plies of the selected fiber material. U.S. Pat. No. 5,052,906 shows examples of using multiple layers of fiber material and a grid type resin distribution system which may be satisfactorily used to form composite roof 30.

The configuration of the foam material and fiber material may be varied to provide the desired structural strength for composite roof 30. The use of foam blocks or a grid of foam material will result in one or more layers of fiber reinforced plastic (not expressly shown) extending between and connected with fiber reinforced plastic layers 51 and 52. For some applications two or more plies of fiber material may be used to form fiber reinforced plastic layers 51 and 52. Foam core 53 may be formed from multiple sections of foam material with each section extending longitudinally over approximately the full length of composite roof 30. Alternatively, foam core 53 may be formed from multiple sections of foam material with each section extending laterally over approximately the full width of composite roof 30.

For some applications, portions of multiple plies of fiber materials may be used to wrap foam core 53 and multiple layers of fiber material may be disposed on what will eventually become the interior surface 62 and the exterior surface 61. The fiber material plies are then impregnated with the selected resin to form a continuous web of fiber reinforced plastic layers between adjacent portions of core 53 and fiber reinforced plastic layers 51 and 52. The closed molding system and infusion of resin results in a continuous web of fiber reinforced plastic. For some application foam core 53 may be coated or treated to prevent foam core 53 from absorbing or being infused with the selected resin. One of the technical advantages of the present invention includes the ability to select various types of foam and fiber materials and to vary the configuration of these materials to enhance the performance of the resulting composite roof 30.

One or more fiber reinforced plastic layers (not expressly shown) may be disposed within foam core 53 on opposite sides of centerline 76 of composite roof 30 and extending longitudinally over approximately the full length of composite roof 30. Such fiber reinforced plastic layers preferably extend between first and second fiber reinforced plastic layers 51 and 52 to provide structural strength for composite roof 30. These additional fiber reinforced plastic layers allow limited flexing and/or twisting of composite roof 30 during movement of the associated railway car 20.

For some applications, composite roof 30 may be painted or covered with coating materials that reflect solar energy from the sun. For example, a coating material containing ceramic fibers (not expressly shown) can be applied to the exterior surfaces of composite roof 30 to significantly reduce the amount of heat absorbed from ultraviolet rays and infrared rays. By using such coating materials, the thickness of foam core 53 may be reduced while maintaining the same level of insulation or the effectiveness of the insulation may be increased for the same thickness of foam cores 53. For some applications the coating material may be applied as part of the resin infusion process. For other applications the coating material may be applied after molding of composite roof 30 has been completed. Coating systems with various ceramic fibers are available from Energy Research Center in Houston, Tex. Also, 3M Company has available various types of thin film or sheet material that may be applied to exterior surface 61 of composite roof 30 to reflect solar energy.

Figure 3:
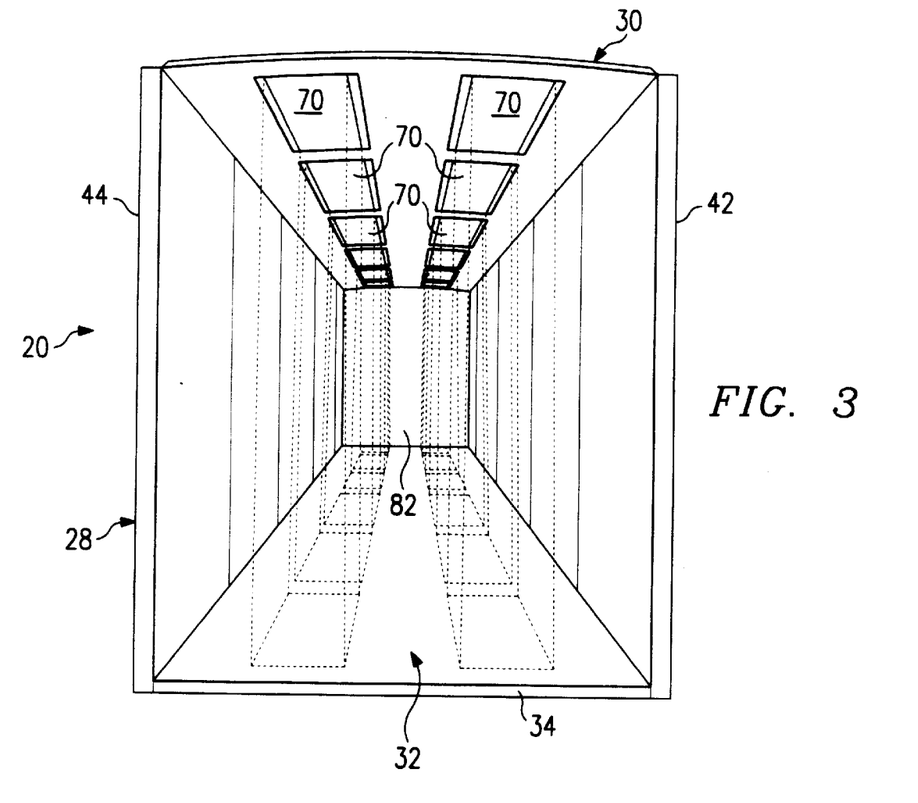
FIG. 3 is a schematic drawing in section with portions broken away showing an interior view of the railway car of FIG. 2.

Depending upon the intended application, composite roof 30 may include one or more translucent areas 70 as shown in FIGS. 2, 3 and 4. Translucent areas 70 are preferably formed during the molding process by providing corresponding void spaces within foam core 53. The number, size and configuration of the void spaces formed within foam core 53 may be selected based on the amount of lighting desired within interior 32. For the embodiment shown in FIGS. 2, 3 and 4, each translucent area 70 has a generally rectangular configuration adjacent to exterior surface 61 and interior surface 62. Translucent areas 70 extend through composite roof 30 and may have various cross sections including rectangular, square, concave or convex. For the embodiment of the present invention as shown in FIGS. 3 and 4, each translucent area 70 preferably has a generally trapezoidal shaped cross section extending across both the length and the width of the respective translucent area 70. The generally trapezoidal cross section extending across the width of one translucent area 70 is shown in FIG. 4.

For purposes of illustration the generally parallel segments of the trapezoidal cross section of translucent area 70 shown in FIG. 4 have been designated 71 and 72. The shorter segment or side 71 is preferably disposed immediately adjacent to exterior surface 61. The longer segment or side 72 is preferably disposed immediately adjacent to interior surface 62. Non-parallel sides 73 and 74 of the generally trapezoidal cross section extend between respective segments 71 and 72 at an angle of approximately forty-five degrees (45°). Non-parallel sides 73 and 74 may be formed at angles other than forty-five degrees (45°) relative to respective segments 71 and 72 which are generally aligned with exterior surface 61 and interior surface 62. However, for some molding applications a preferred angle for portions of foam core 53 immediately adjacent to each translucent area 70 will be approximately forty-five degrees (45°).

During the process of molding composite roof 30, foam core 53 is normally disposed between the fiber materials which form first layer 51 of fiber reinforced plastic and second layer 52 of fiber reinforced plastic. The void spaces formed in foam core 53 to provide translucent areas 70 allow close intimate contact between these same fiber materials. As a result first layer 51 of fiber reinforced plastic and second layer 52 of fiber reinforced plastic are integrally bonded to each other within each translucent area 70 during the molding process. First layer 51 of fiber reinforced plastic and second layer 52 of fiber reinforced plastic are preferably integrally bonded adjacent to each other to form a smooth continuous exterior surface 61. The generally trapezoidal cross sections associated with each translucent area 70 provide corresponding indentations within interior surface 62.

Various materials may be disposed within first layer 51 of fiber reinforced plastic and second layer 52 of fiber reinforced plastic to provide a desired coloring or tint on the respective exterior surface 61 and interior surface 62. Various acrylic compounds may also be disposed within exterior surface 61 to provide ultraviolet protection for composite roof 60. A clear acrylic surface or coating may be particularly desirable within the portion of fiber reinforced plastic layers 51 and 52 at each translucent area 70 to protect lading such as paper carried within the associated enclosed structure 28.

For some applications a composite roof may be provided without any translucent areas 70. Core 53 of this type of composite roof would have a generally uniform cross section such as shown in FIG. 5 extending throughout the length and the width of the resulting composite structure.

Various techniques may be used to mount composite roof 30 on end walls 82 and 84 and side walls 42 and 44 opposite from floor 34 to define in part hollow interior 32. For the embodiment of the present invention as shown in FIGS. 2, 4, 5, 6 and 7 respective metal chords 86, 87, 88 and 89 are respectively attached to the upper edge of side walls 42, 44, and end walls 82 and 84 opposite from floor 34. Metal chords 86, 87, 88 and 89 may also be referred to as "top chords."

For the embodiment of the present invention as shown in FIGS. 4 through 6, metal chords 86, 87 and 89 have a generally "Z" shaped configuration for the embodiment shown in FIGS. 1A–6. Each metal chord 86, 87, 88 and 89 includes an upper portion or upper leg 90 which cooperate with each other to provide a generally smooth metal surface 92 extending around the perimeter of enclosed structure 28. Metal chords with other configurations such as "T" shaped may be satisfactory used to provide similar metal surfaces 92 for mounting composite roof 30 on enclosed structure 28. U.S. Pat. No. 1,749,473 shows various examples of top chord assemblies that may be used to attach composite roof 30 with enclosed structure 28.

As previously noted, composite roof 30 has a generally rectangular configuration for the embodiment shown in FIGS. 1A–6. The portions of foam core 53 disposed adjacent to the perimeter of composite roof 30 are preferably tapered at an angle of approximately forty-five (45°) relative to exterior surface 61 and interior surface 62. For one embodiment as best shown in FIGS. 4 and 5, first layer 51 of fiber reinforced plastic and second layer 52 of fiber reinforced plastic may be integrally molded with each other to form flange 56 of fiber reinforced plastic extending around the perimeter of composite roof 30. For some applications fiber reinforced plastic flange 56 may be adhesively bonded with metal surfaces 92. For other applications fiber reinforced plastic flange 56 may be attached to metal surfaces 92 using various types of mechanical fasteners such as stud or bolt 58. For still other applications a combination of adhesive bonding and mechanical fasteners 58 may be satisfactory used to attach composite roof 30 with metal surface 92. A gasket (not shown) may be disposed between fiber reinforced plastic flange 56 and adjacent metal surfaces 92. Various types of elastomeric materials and other sealing compounds may be satisfactorily used to provide a gasket to substantially reduce or eliminate potential leakage of water and/or air between fiber reinforced plastic flange 56 and metal surfaces 92.

Top chords 86, 87, 88 and 89 will normally be attached to the top edge or upper edge of respective side walls 42 and 44 and end walls 82 and 84 using welding techniques or other techniques associated with fabrication of a conventional railway boxcar. For some applications fiber reinforced flange 56 may first be attached with the respective metal surface 92 of top chords 86, 87, 88 and 89. Composite roof 30 with top chords 86, 87, 88 and 89 attached thereto may then be mounted on and secured with side walls 42 and 44 and end walls 82 and 84.

For some applications metal flange 64, a portion of which is shown in FIG. 6, is preferably co-molded with and extending from core 53 around the perimeter of composite roof 30. For a railway boxcar having a nominal length of fifty feet, the associated composite roof 30 may have a length of approximately fifty feet seven inches and a width of approximately nine feet six inches. A pair of metal strips having corresponding lengths of approximately fifty feet seven inches may be co-molded within respective portions of foam core 53 which will be disposed adjacent to side walls 42 and 44. Another pair of metal strips having corresponding lengths of nine feet six inches may be co-molded within respective portions of foam core 53 which will be disposed adjacent to end walls 82 and 84. Such metal strips may have a thickness of approximately one-eight of an inch and a width of approximately four inches.

For the embodiment shown in FIG. 6 metal strip 66 which forms a portion of metal flange 64 is shown co-molded within portions of composite roof 30 adjacent to side wall 44. The length of metal strip 66 corresponds approximately with the length of composite roof 30 and side wall 44. The width of metal strip 66 is approximately four inches of which approximately two and one-half inches is disposed adjacent to and co-molded with foam core 53. The remaining one and one-half inch extends from composite roof 30 for attachment with respective metal surface 92.

During the molding process one or more layers of the selected fiber material are preferably disposed on the portions of the metal strips which will be molded with foam core 53. For the embodiment shown in FIG. 6, the result of the co-molding process is layer 52a of fiber reinforced plastic disposed on and attached with one side of metal strip 66 and layer 52b of fiber reinforced plastic attached to the opposite side of metal strip 66. Relatively strong bonds particularly with respect to sheer strength are formed between the resin and the respective metal strips during the process of co-molding to form metal flange 64 around the perimeter of composite roof 30. Also, the bonds formed between the respective metal strips and composite roof 30 are less likely to be damaged by changes in temperature.

For this particular embodiment the thickness of layer 52a of fiber reinforced plastic is shown approximately equal to the thickness of leg 90 of top chord 87 which provides surface 92. Butt weld 68 is preferably formed along one edge of metal strip 66 and surface 92. Similar butt welds are preferably disposed along the edges of flange 64 and metal surfaces 92 corresponding with end walls 82 and 84 and side wall 42. Welding around the full perimeter of metal flange 64 will provide a strong, water tight seal between composite roof 30 and interior 32 of enclosed structure 28.

Most conventional railway boxcars have a relatively long, flat roof with a slight arch extend across the width of each roof. For the embodiment shown in FIGS. 4 and 5 interior surface 62 of composite roof 30 may have a slightly concave configuration or arch and exterior surface 61 may have a corresponding slightly convex configuration or arch. For one application interior surface 62 at center line 76 of composite roof 30 may be approximately five-eighths of an inch above horizontal as compared with the portion of interior surface 62 adjacent to metal surface 92.

Each door 180 has a first position blocking the respective opening 46 to form a barrier between interior 32 and the exterior of railway car 20. Each door 180 also has a second position which allows access to interior 32 of railway car 20 through the respective opening 46. Various types of doors may be satisfactorily used with the present invention including conventional doors fabricated from steel and/or wood materials or doors fabricated from materials similar to composite roof 30. Each door 180 is preferably mounted on respective side walls 42 and 44 using conventional hardware such as operating pipes, operating mechanisms, rollers, locking bars, gears and cams associated with a conventional railway boxcar. Such items may be obtained from several vendors including YSD Industries Inc. (Youngstown Steel Door) located in 3710 Henricks Road, Youngstown, Ohio, 44515 and Pennsylvania Rail Car located at 584 Fairground Road, Mercer, Pa., 16137.

Figure 7:
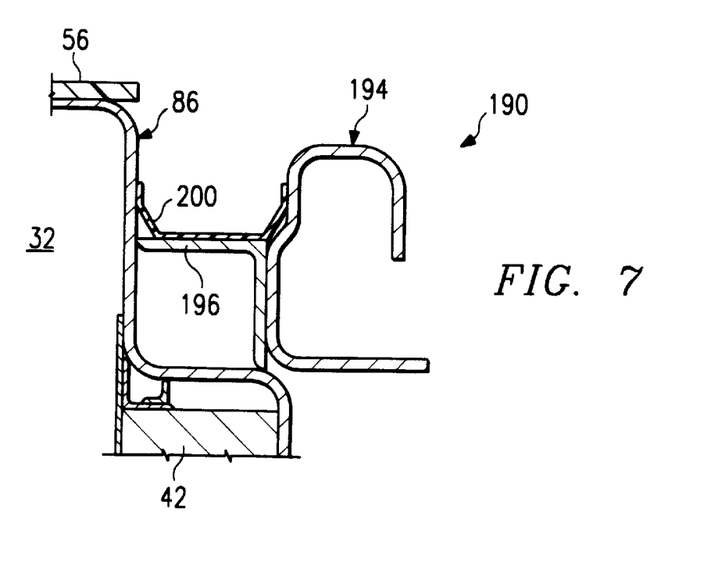
FIG. 7 is a schematic drawing in section with portions broken away showing a rain gutter incorporating teachings of the present invention disposed within a top retainer and guide rail assembly mounted adjacent to an opening or doorway in a side wall of a railway car.

Typically, doors 180 will be slidably mounted in an upper track and a lower track (not expressly shown) which are attached adjacent to respective openings 46 in side walls 42 and 44. Top retainer and guide rail assembly 190 which may be satisfactorily used with door 180 is shown in FIG. 7. Top retainer and guide rail assembly 190 preferably includes upper track 194, angle iron 196 and fiber reinforced plastic strip 200. Upper track 194 is shown attached to top chord 86 by angle iron 196. Various welding techniques and/or mechanical fasteners may be used as desired.

Strip 200 of noncorrosive material is preferably molded with a configuration to match adjacent portions of top chord 86, angle iron 196 and upper track 194. For the embodiment shown in FIG. 7 strip 200 has a generally U-shaped cross section corresponding with a recess formed between top chord 86 and upper track 194 disposed above the respective opening 46. Strip 200 is preferably adhesively bonded with adjacent portions of angle iron 196, top chord 86 and upper track 194. Strip 200 functions as a rain gutter to substantially minimize any run-off of rain water from composite roof 30 damaging lading during loading or unloading through the associated opening 46.

For the embodiment shown in FIG. 7, strip 200 is preferably formed from fiber reinforced plastic. However, strip 200 may be satisfactorily formed from a wide variety of materials that are resistant to corrosion when exposed to water. Such materials include, but are not limited to, thermosetting resins, thermoplastic resins, fiber reinforced plastic, aluminum, aluminum alloys, stainless steel and copper nickel alloys. Such materials may sometimes be referred to as "noncorrosive materials".

Although the present invention and its advantages have been described in detail, it should be understood that various changes, substitutions and alterations can be made herein without departing from the spirit and scope of the invention as defined by the following claims.

What is claimed is:

1. A composite roof for mounting on a railway car to form a portion of an enclosed structure comprising:
    a fiber reinforced composite unit having a core wrapped with a fiber material and the fiber material infused with resin to encapsulate the core between layers of fiber reinforced plastic during molding of the composite roof;
    the fiber reinforced composite unit having a perimeter;
    the fiber reinforced composite unit having a metal flange co-molded with the core and partially extending from the core at the perimeter; and
    the metal flange defining in part means for attaching the composite roof with other components of the enclosed structure.

2. The composite roof of claim 1 further comprising the fiber reinforced composite unit having a generally rectangular configuration with a length and a width corresponding generally to a length and a width of the enclosed structure.

3. The composite roof of claim 1 wherein the fiber material is selected from the group consisting of carbon, boron, graphite, glass and aramid and the resin is selected from the group consisting of epoxy, polyester, vinyl ester and vinyl.

4. The composite roof of claim 1 wherein the core comprises polymeric foam selected from the group consisting of urethane, polyurethane, styrene and polystyrene.

5. The composite roof of claim 1 wherein the fiber reinforced composite unit further comprises:
    an exterior surface formed by at least a first layer of fiber reinforced plastic and an interior surface formed by at least a second layer of fiber reinforced plastic;
    the first layer of fiber reinforced plastic and the second layer of fiber reinforced plastic attached to and integrally molded with the metal flange.

6. The composite roof of claim 1 wherein the fiber reinforced composite unit further comprises:
    an exterior surface formed by at least a first layer of fiber reinforced plastic and an interior surface formed by at least a second layer of fiber reinforced plastic;
    a plurality of metal strips disposed adjacent to and co-molded with the core to allow each metal strip to partially extend from the core; and
    the first layer of fiber reinforced plastic attached to and integrally molded with the second layer of fiber reinforced plastic adjacent to the metal strips to securely anchor the metal strips with the core and to provide the metal flange extending from the perimeter of the core.

7. The composite roof of claim 1 wherein the fiber reinforced composite unit further comprises a plurality of void spaces formed in the core and the layers of fiber reinforced plastic integrally molded immediately adjacent to each other within each void space to provide respective translucent areas in the fiber reinforced composite unit.

8. The composite roof of claim 7 wherein each translucent area further comprises a generally rectangular configuration with portions of the core disposed on each side thereof and the portions of core adjacent to each void space disposed at an angle of approximately forty five degrees relative to an interior surface of the composite roof.

9. The composite roof of claim 7 wherein the layers of fiber reinforced plastic at each translucent area further comprise material to at least partially block transmission of ultraviolet light through the respective translucent area.

10. The composite roof of claim 1 further comprising:
    the fiber reinforced composite unit having a generally rectangular configuration with a length and a width corresponding generally to a length and a width of the enclosed structure defined in part by a pair of opposite substantially rectangular side walls, each side wall having top and bottom edges and ends with the distance between the ends of each side wall corresponding generally with the length of the enclosed structure;
    the length of the composite roof selected to be approximately equal to the length of the side walls;
    a pair of opposite substantially rectangular end walls, each end wall having upper and lower edges and ends extending between and joined to a respective end of each of the side walls; and
    a substantially rectangular floor having opposite side edges and ends, the floor extending between and joined to the bottom edges of the side walls and extending between and joined to the bottom edges of the end walls.

11. A railway car having a generally enclosed structure with a composite roof mounted on the enclosed structure, comprising:
    the enclosed structure defined in part by a pair of opposite side walls with each side wall having top and bottom edges and opposite ends;
    a pair of opposite end walls with each end wall having top and bottom edges and opposite ends;
    each end wall extending between and joined to respective ends of each of the side walls;
    a floor having opposite side edges and ends, the floor extending between and joined to the bottom edges of the side walls and extending between and joined to the bottom edges of the end walls;
    a composite roof mounted on and attached to the top edges of the end walls and the side walls opposite from the floor;
    the composite roof having a core wrapped with multiple layers of fiber material and the fiber material infused with resin to encapsulate the core between layers of fiber reinforced plastic during molding of the composite roof; and
    the composite roof having a perimeter which defines in part means comprising an attachment flange molded into the composite roof for attaching the composite roof with respective top edges of the side walls and the end walls such that the attachment flange remains outside an enclosure defined by the enclosed structure.

12. The railway car of claim 11 further comprising an opening formed intermediate the ends of each side wall to provide access to the enclosed structure for loading and unloading lading from the railway car.

13. The railway car of claim 12 further comprising:
a top retainer and guide rail assembly disposed above each opening of the respective side walls;
a door slidably disposed within each top retainer and guide rail assembly with each door having a first position blocking access through the respective opening and a second position allowing access to the interior of the enclosed structure through the respective opening; and
a strip of fiber reinforced plastic attached to the top retainer and guide rail assembly extending along the length of the respective opening to form a composite rain gutter.

14. The railway car of claim 11 wherein the enclosed structure further comprises a generally rectangular configuration having a length and a width and the composite roof further comprises a generally rectangular configuration having a length and a width corresponding with the length and the width of the enclosed structure.

15. The railway car of claim 11 wherein the composite roof further comprises:
the fiber material selected from the group consisting of carbon, boron, graphite, glass and aramid;
the resin selected from the group consisting of epoxy, polyester, vinyl ester, and vinyl; and
the core formed from material selected from the group consisting of urethane, polyurethane, styrene and polystyrene.

16. The railway car of claim 11 wherein the composite roof further comprises:
an exterior surface formed by at least a first layer of fiber reinforced plastic and an interior surface formed by at least a second layer of fiber reinforced plastic;
the first layer of fiber reinforced plastic attached to and integrally molded with the second layer of fiber reinforced plastic to form a flange of fiber reinforced plastic extending around the perimeter of the core; and
the flange of fiber reinforced plastic providing a portion of the means for attaching the composite roof on the enclosed structure.

17. The railway car of claim 11 wherein the composite roof further comprises:
an exterior surface formed by at least a first layer of fiber reinforced plastic and an interior surface formed by at least a second layer of fiber reinforced plastic;
a plurality of metal strips disposed adjacent to and co-molded with the core to allow each metal strip to partially extend from the core;
the first layer of fiber reinforced plastic attached to and integrally molded with the second layer of fiber reinforced plastic adjacent to the metal strips to securely anchor the metal strips with the core and to provide a metal flange extending from the perimeter of the core; and
the metal flange providing a portion of the means for attaching the composite roof on the enclosed structure.

18. The railway car of claim 11 wherein the composite roof further comprises a plurality of void spaces formed in the core and the layers of fiber reinforced plastic integrally molded immediately adjacent to each other within each void space to provide respective translucent areas in the composite roof.

19. The railway car of claim 11 further comprising material for reflecting ultraviolet light disposed within a layer of fiber reinforced plastic which forms an exterior surface of the composite roof.

20. A railway car having a generally enclosed structure with a roof mounted thereon, comprising:
the enclosed structure defined in part by a pair of opposite side walls with each side wall having top and bottom edges and opposite ends;
a pair of opposite end walls with each end wall having top and bottom edges and opposite ends;
each end wall extending between and joined to respective ends of each of the side walls;
a floor having opposite side edges and ends, the floor extending between and joined to the bottom edges of the side walls and extending between and joined to the bottom edges of the end walls;
the roof mounted on and attached to the top edges of the end walls and the side walls opposite from the floor;
an opening formed intermediate the ends of each side wall to provide access to the enclosed structure for loading and unloading the railway car;
atop retainer and guide rail assembly disposed above each opening of the respective side walls;
a door slidably disposed within each top retainer and guide assembly having a first position blocking access through the respective opening and a second position allowing access to the interior of the enclosed structure through the respective opening; and
a strip of noncorrosive material attached to the top guide retainer and guide rail assembly extending along the length of the respective opening to form a rain gutter.

21. The railway car of claim 20 wherein the strip of noncorrosive material is selected from the group consisting of a thermosetting resin, a thermoplastic resin, fiber reinforced plastic, aluminum, aluminum alloys, stainless steel, and copper nickel alloys.

22. A railway car having a generally enclosed structure with a composite roof mounted on the enclosed structure, comprising:
the enclosed structure defined in part by a pair of opposite side walls with each side wall having top and bottom edges and opposite ends;
a pair of opposite end walls with each end wall having top and bottom edges and opposite ends;
each end wall extending between and joined to respective ends of each of the side walls;
a floor having opposite side edges and ends, the floor extending between and joined to the bottom edges of the side walls and extending between and joined to the bottom edges of the end walls;
a respective top chord attached to the top edge of each side wall and end wall;
a composite roof mounted on and attached to the top chords of the end walls and the side walls opposite from the floor;
the composite roof having a core wrapped with multiple layers of fiber material and the fiber material infused with resin to encapsulate the core between layers of fiber reinforced plastic during molding of the composite roof; and
the composite roof having a perimeter which defines in part means for attaching the composite roof with respective top chords of the side walls and the end walls.

23. A railway car having a generally enclosed structure with a composite roof mounted on the enclosed structure, comprising:

the enclosed structure defined in part by a pair of opposite side walls with each side wall having top and bottom edges and opposite ends;

a pair of opposite end walls with each end wall having top and bottom edges and opposite ends;

each end wall extending between and joined to respective ends of each of the side walls;

a floor having opposite side edges and ends, the floor extending between and joined to the bottom edges of the side walls and extending between and joined to the bottom edges of the end walls;

a respective top chord attached to the top edge of each side wall and end wall;

a composite roof mounted on and attached to the top chords of the end walls and the side walls opposite from the floor;

the composite roof having a core wrapped with multiple layers of fiber material and the fiber material infused with resin to encapsulate the core between layers of fiber reinforced plastic during molding of the composite roof; and the composite roof having a plurality of void spaces formed in the core and the layers of fiber reinforced plastic integrally molded immediately adjacent to each other within each void space to provide respective translucent areas in the fiber reinforced composite unit.

* * * * *